April 23, 1946. C. R. BUSCH 2,398,918
TRUSSED BRAKE BEAM AND/OR BRAKE HEAD
Filed Aug. 5, 1943 4 Sheets-Sheet 1
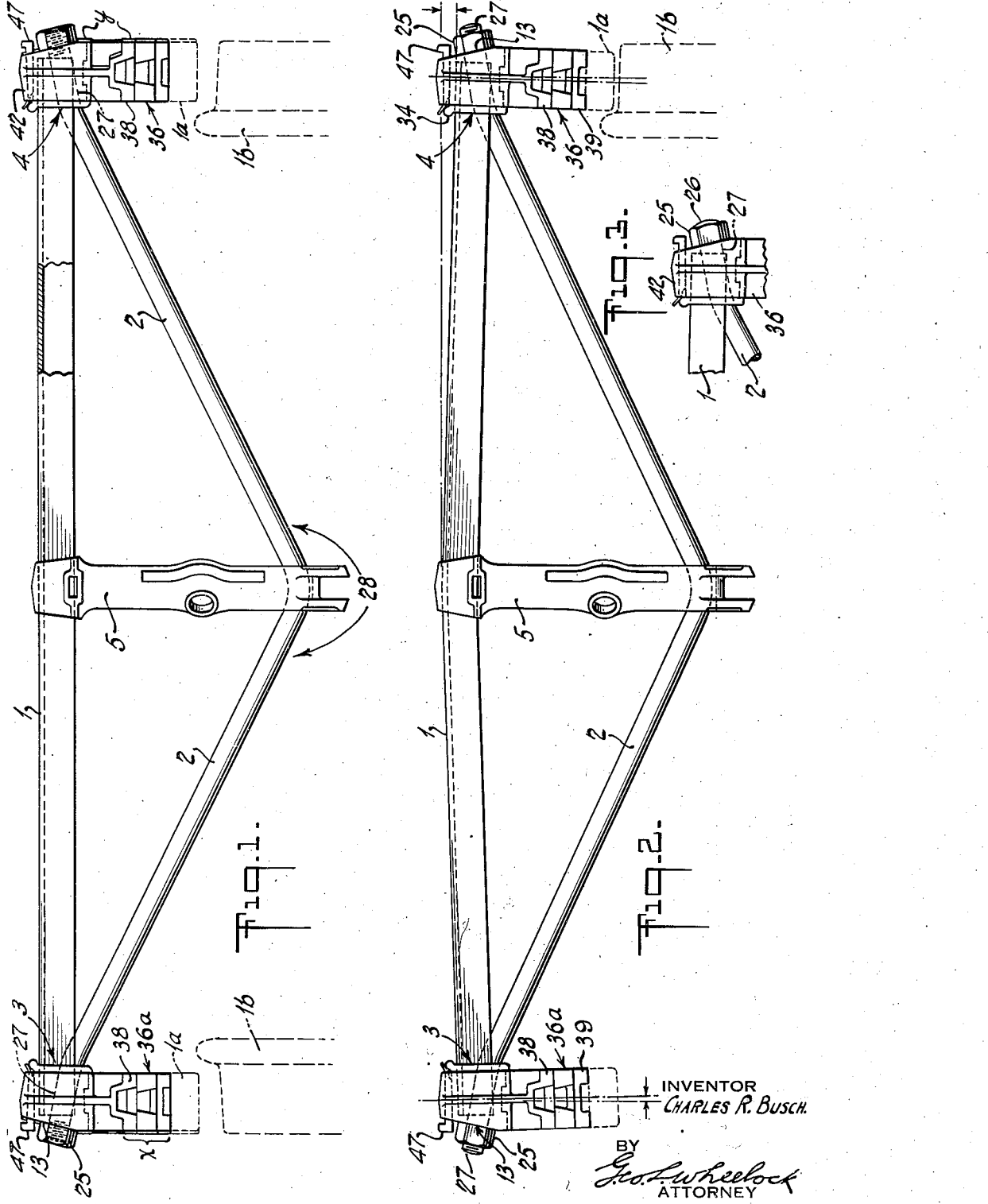
INVENTOR
CHARLES R. BUSCH.
BY
ATTORNEY

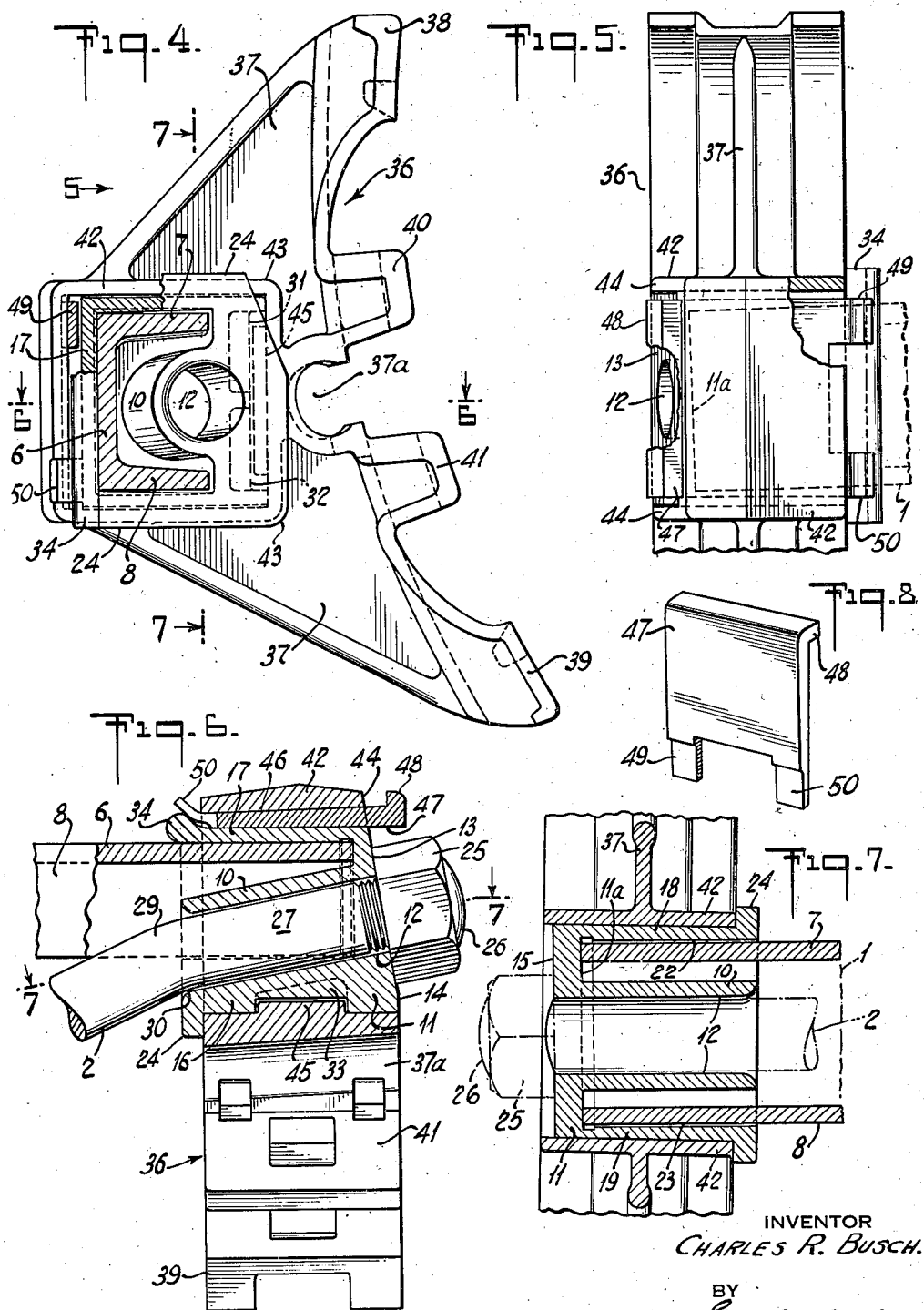

April 23, 1946. C. R. BUSCH 2,398,918
TRUSSED BRAKE BEAM AND/OR BRAKE HEAD
Filed Aug. 5, 1943 4 Sheets-Sheet 3
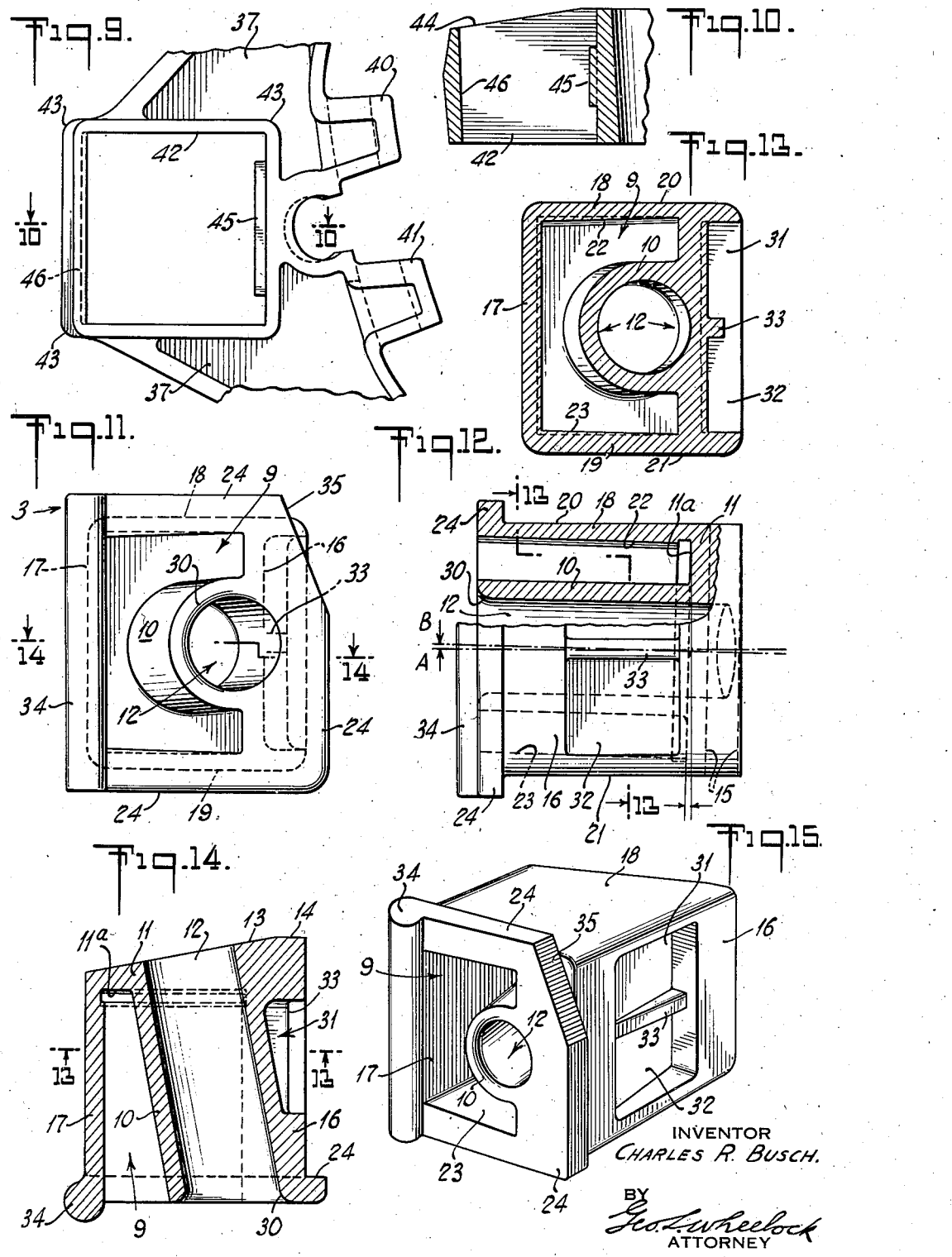
INVENTOR
CHARLES R. BUSCH.
BY
Geo. L. Wheelock
ATTORNEY April 23, 1946.   C. R. BUSCH   2,398,918
TRUSSED BRAKE BEAM AND/OR BRAKE HEAD
Filed Aug. 5, 1943   4 Sheets-Sheet 4
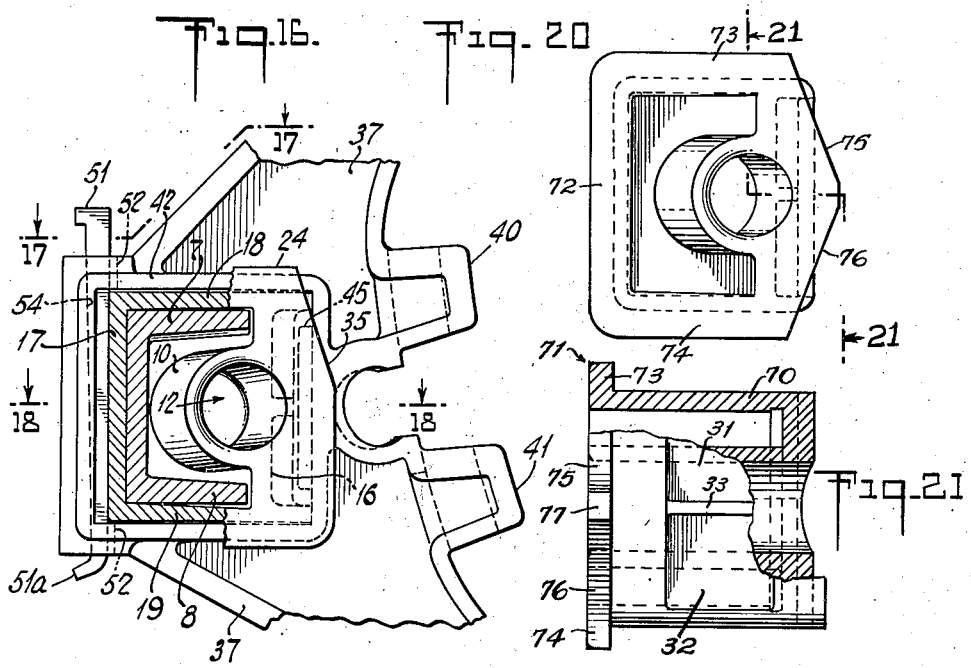
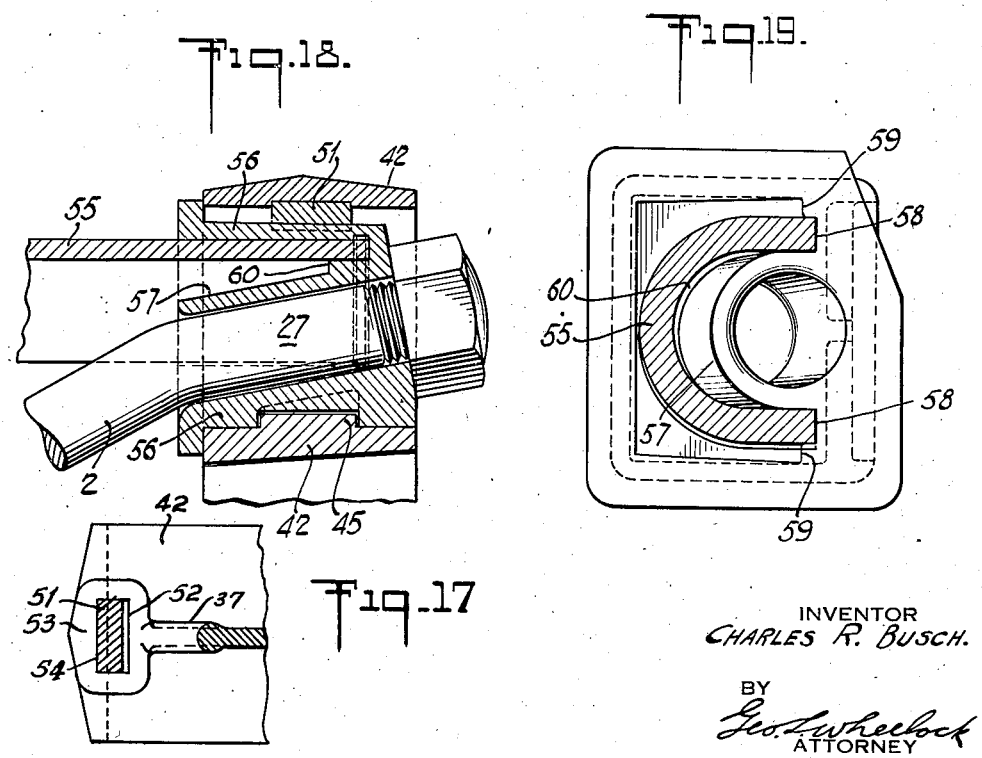
INVENTOR
CHARLES R. BUSCH.
BY
Geo. L. Wheelock
ATTORNEY Patented Apr. 23, 1946

2,398,918

UNITED STATES PATENT OFFICE 2,398,918

TRUSSED BRAKE BEAM AND/OR BRAKE HEAD

Charles R. Busch, Orange, N. J., assignor to Buffalo Brake Beam Company, New York, N. Y., a corporation of New York Application August 5, 1943, Serial No. 497,418

32 Claims. (Cl. 188—219)

The present invention relates to brake beams for railway cars, preferably of the truss type, and to accessory improvements to go on the beam, as well as in the beam itself.

A compartively recent checking of the braking equipment of railway freight cars by the American railroads revealed that more than fifty (50%) per cent of the hanger supported truss type of brake beams were removed from the cars on account of worn brake heads. Furthermore, it is customary for the railroads to assemble all of such brake beams as are in need of repairs at a central point for reclamation as they deem it undesirable and impractical to repair and replace the heads at multifold local points.

During the aforesaid check up it was also found that about twenty (20%) per cent of the brake beams removed was due to broken tension rods. This was necessary for the reason that the tension rods now in use are threaded at the ends and the breakage is confined to the threaded ends, inside of the nuts, which indicated that extreme fatigue is the cause of the breakage. In such conventional type of beam the rod enters the brake head on a straight line from the center line of the strut, so that any weaving or breathing of the beam concentrates all of the strains at the unprotected threaded portions of the tension rod.

Also, it is customary to use rough castings and semi-finished nuts, and those skilled in the art know these castings are not true and that they prevent perfect seating of the nuts on the heads. These tolerances or inaccuracies also impose tremendous strains on the unprotected threaded portions thus hastening fatigue and finally the failure of the beam to serve its necessary purpose.

Therefore, the main object of the present invention is to provide a novel hanger-supportable truss brake beam, that is not only a novel article of manufacture, but is so designed that all of the approximately twenty million (20,000,-000) truss beams now in service can be converted to such novel type, by making use of the compression member, the tension member and the strut of such beam, which it is believed would be of possibly tremendous economical value.

To overcome the defects and failures mentioned, as well as others, and to permit the present trussed brake beams to be converted into more durable and more reliable beams, it is proposed under the present invention to provide a trussed brake beam having novel truss locks at each end, and, to be mounted thereon, removable brake heads of novel construction which will permit the parts of the beam proper now in service to be re-used, so as to produce a new article of manufacture.

With these broad objects in view, together with other and more specific objects, the present invention consists of certain features of construction and combinations of parts to be hereinafter described and then claimed, with reference to the accompanying drawings showing desirable and preferred embodiments of the invention, and in which—

Fig. 1 is a top plan of a beam before it is cambered;

Fig. 2 is a similar view of such beam after it is cambered, showing the brake heads in final position, shifted somewhat from the position shown in Fig. 1;

Fig. 3 is a broken view of the right end of the beam showing the final step in making the beam;

Fig. 4 is a sectional view of the compression member, and an elevation of the brake head as viewed toward its inward side, the truss lock being shown as partly broken away;

Fig. 5 is a rear elevation of the parts shown in Fig. 4;

Fig. 6 is a horizontal section on line 6—6 of Fig. 4, adding the tension rod and its nut;

Fig. 7 is a vertical section on line 7—7, Figs. 4 and 6, looking in the direction of the arrow;

Fig. 8 is a perspective view of a preferred key to secure the brake head;

Fig. 9 is broken side elevation of the brake head, parts being dotted;

Fig. 10 is a transverse section of the head on line 10—10, Fig. 9;

Fig. 11 is an end view of the truss lock, parts in dotted lines, and viewed towards its inward end;

Fig. 12 is a front elevation of the lock partly in vertical section, and parts dotted;

Fig. 13 is a vertical section of Fig. 12, on line 13—13, looking in the direction of the arrows;

Fig. 14 is a section on line 14—14, Fig. 11;

Fig. 15 is a perspective view of the truss lock;

Fig. 16 is a broken sectional elevation of the assembled parts of the beam, except the tension rod, and showing how the brake head is keyed on by a modified key, parts shown in broken lines;

Fig. 17 is a broken detail section of Fig. 16 on line 17—17;

Fig. 18 is a section which may be assumed to be on line 18—18 of Fig. 16, showing a U-shaped channel member, and the tension rod also;

Fig. 19 is a sectional elevation showing the U-shaped channel member of Fig. 18 and more specifically how the same is held in the truss lock;

Fig. 20 is an end view of a modified truss lock, and

Fig. 21 is a broken sectional view of Fig. 20, on line 21.

Referring to Figs. 1 to 7, inclusive, a trussed brake beam is shown which preferably includes a steel compression member 1, a steel tension rod 2, hollow or block-like metal castings or forgings 3, 4, one at each end of the joined members, and a strut 5 of any preferred kind. The compression member shown is composed of a channel part which is of rectangular cross section providing a web 6 and flanges 7, 8, although it is possible to use other cross sections.

The hollow or block-like members 3, 4, serve as truss locks, as will be seen herefrom, and looking toward the back of the beam the member or lock 4 is to be considered a left and the one 3 a right, and as the left one 4 will first be described, reference can also be had to Figs. 11 to 15 which disclose the same more in detail.

Block member or lock 4 is hollow to provide a socket portion 9 for receiving the end of the compression member—and it is provided with an interior inclined sleeve or thimble 10, extending from the surface at the open end of the hollow of the lock to the end wall 11, which is closed except for a reduced through hole 12 at the adjacent end of the thimble, the latter and said hole receiving one end of the tension rod 2. Hence, the inclined passage through the thimble 10 is continued by the hole 12 so that the passage terminates at the opposite end surfaces of the lock member 4 and thereby reinforces the tension member.

The outer surface 13 of the end wall 11 of the lock is inclined from the flat surface 14 at the end of the lock to provide a nut-seat as is customary. A slight lateral canting of the seat 14 is indicated at 15, Figs. 7 and 12 for more positively securing a nut.

Truss lock 4 has a rectangular or non-circular girth so as to provide front and rear walls 16, 17, respectively, and top and bottom walls 18, 19, respectively, for receiving a removable brake head.

Referring to Fig. 12, the upper surface 20 and the lower surface 21 of the truss lock are parallel with the horizontal central plane A of the lock as indicated by broken lines, which is the position of the lock when ultimately fixed on the beam. The thimble 10 of the lock is slightly canted upwardly from such plane A as indicated by the broken line B, which coincides with the axis of said thimble. However, the said plane B extends at a right angle to the plane of the inner surface 11ᵃ of end wall or nut seat 11 whose outer seating surface 13 is laterally canted as indicated at 15, as before explained, so that the surfaces 11ᵃ and 15 are both canted preferably to the same degree, preferably at an angle of 1 in 20 although they are not parallel.

As the thimble 10 is slightly canted from horizontal, the upper inner surface 22 of top wall 18 and the lower inner surface 23 of bottom wall 19 are correspondingly canted to the same degree, for the same reason. Consequently said surfaces 22, 23, extend in parallel planes at right angles to the plane in which inner surface 11ᵃ of the wall 11 is canted and are slightly inclined to the upper and lower surfaces 20 and 21 of the walls 18 and 19 of the lock.

An exterior flange or projecting edge portion 24 on the lock surrounds the open end of the socket portion 9 and the inner end of the thimble 10 so as to reinforce them. Nuts 25 are screwed onto the ends of the tension rod and against the seats 13 of the truss locks and the ends upset at 26 when the beam is finished as in Fig. 2.

As shown in Figs. 1, 2, 3 and 6 the screw-threaded end portions 27 of the tension rod are bent forwardly to the same extent so as to be out of line with and in the plane of the main, bow-shaped, middle portion 28 of the rod, providing curved bends 29 which engage with rounded corners or shoulders 30 of the lock (see Fig. 6) to provide fulcruming bearings for the rod.

Each truss lock 3, 4, has special exterior features to function with a brake head, among which are recesses 31, 32, separated by a longitudinal rib 33 and which are formed in the front wall 16, and such construction is preferred to obtain lightness of the locks without the sacrifice of necessary strength, although a single recess may be used; and such rib 33 reinforces the adjacent portion of thimble 10.

At the back of each lock the flange 24 is so enlarged and rounded as to form a transverse key-upsetting bead or anvil-portion 34, which preferably bulges out rearward of the plane of the flange. The flange 24 does not continue as such, past the upper front edge of the lock 4, as what would otherwise be the corresponding corner of the flange is absent due to the slanted edge 35, which leaves suitable clearance for a brake hanger without weakening the desired reinforcement of the lock by said flange. The effect of the restricting edge 35 is the same as if the flange had a suitable notch or recess to prevent interference with the hanger.

As the standard brake beam of a railway car operates on an arc of large radius which is below the center of the axle, in practice the lower ends of the brake heads thereon are made to extend approximately two inches ahead of the upper ends. Due to the result of cambering such beam the lower toes are caused to, or have a tendency to, toe inwardly with respect to the upper toes, because of such advance position ahead of the upper toes, with the result that the heads do not, as they should, stand perpendicularly to the breadthwise plane of the beam when ready to use. With a view to overcoming this objectionable effect and to square up the heads with such plane during cambering is the object of the canted surfaces in the truss locks and the canted thimble of the present invention, and the desired functions thereof will be explained after describing the heads shown in the figures before referred to, for it is the proper orienting of such heads with respect to the beam that such functions ultimately serve their aim.

A left brake head 36 is shown in particular in Figs. 4 to 7 and 9, 10, and preferably includes a malleable casting or body having a main back portion substantially in the form of a vertical central rib 37 which is enlarged laterally to form the face portion of the head bisected by the rib. The head also may consist of a forging or be built up. The upper and lower ends of the head are provided with customary apertured toes 38, 39, for engaging the corresponding ends of a brake shoe. Between the lugs 38, 39, the face portion of the head is also formed with the customary middle lugs 40, 41, for the abutment of the shoe and apertured for receiving a key.

The rib or back portion 37 is enlarged at the middle portion in such manner that the enlargement may be formed into a collar or beam mounting hub 42 of rectangular shape except for a slight rounding off of the corners 43, and preferably the opening through the collar is made somewhat oversize so that the collar by itself will not fit snugly on the end of the beam, permitting the head to be quickly placed in position and removed. Preferably the front surface 44 of the collar is inclined so as to match the inclined nut seat 11 of the truss lock.

A projection or boss 45 is raised slightly from the inner surface of the front wall of collar 42, so that the so interrupted surface will match and interlock with the reversely interrupted surface of the truss lock having the recesses 31, 32, in the front thereof when the head is keyed in position, at which position the boss 45 may be slightly spaced from the rib 33. Obviously, the said surface interruptions may be reversed with respect to their arrangement on the collar and truss lock.

Collar 42 has the inner surface 46 of its back wall provided with a slant extending transversely of the collar, and such slanted surface preferably has a width corresponding to the distance between the top and bottom walls of the collar. The distance between the boss 45 and the slanted surface 46 is ample enough, when the head is being placed onto the truss lock of the beam, to permit the collar 42 to clear the nut 25 and the boss 45 to be interlocked with the truss lock. When the head has been properly located on the beam it is preferably locked in position by means of a slightly tapered key 47, shown in Figs. 4, 5, 6 and 8.

Key 47 may consist of a bendable malleable casting of soft steel. The key has at one end a bent over lip or flange 48 which provides a head for driving it into position between and into firm engagement with the back walls of the collar and the truss lock, and the opposite leading edge is thinner so that when the key is being driven home the leading edge will be automatically deflected and upset by pressing upon the anvil portion 34 of the truss lock. The leading end of the key is formed by spaced apart tongues 49, 50, for the reason that the key is preferably about as broad as the space into which it is closely driven to give it great strength and durability. Such key extends parallel with the length of the compression member 1 and is sufficiently spaced from the nut 25 to permit it to be freely hammered into position without hammering on said nut.

The elements hereinbefore described complete the truss and left head, except for the right lock 3 and its companion right head 36a, as the truss lock 4 and the head 36 are lefts. As the lock 4 serves only as a left, in order to provide a truss lock 3 to serve as a right, it obviously only is necessary to use a lock which is similar to the one 4, the only difference in this case being that instead of blanking or removing the corner of the reinforcement 24 by the slanting edge 35, Figs. 11 and 15, only the front corner of the reinforcement which is below edge 35 is absent in the same way. This permits a lock similar to that shown in these two figures to be turned end over end and used as a right lock, and when the two so slightly different locks are applied to the ends of the beam their inclined nut-seats will face in opposite directions away from the beam and corresponding provisions at the front and top of the beam will be provided which prevent interference of the locks with the required movements of the brake beam hangers.

A right brake head 36a to go on the lock 3 is in all respects similar to the head 36 of Fig. 4, except that instead of a hanger opening 37a indicated in full and broken lines in said figure, and which extends at a slant away from an observer, in front of the beam, and transversely across the head similarly to what is shown in full lines in Fig. 21, it is obvious that the hanger opening for a right head should extend at a slant in the opposite direction, so that when the two thus very slightly differing heads are on the ends of the beam the openings will extend along lines which converge at the front of the beam.

Now, it is well to refer to Figs. 1, 2 and 3 in describing the functions of the right and left truss locks, as previously noted, during the completion of the assembly of the parts which have been described.

In Fig. 1 all of the elements of the beam are shown as merely assembled closely, not rigidly, together, the nuts 25 not having been fully tightened up. A straight uncambered, length of channel metal is provided to ultimately serve as the compression member. Then the ends of such straight length are inserted into the sockets, such as 9, of the two truss locks after the ends of the tension member have been inserted through the thimbles, such as 10, and through the walls of the nut seats. When the ends of the ultimate compression member 1 have been fully inserted into said sockets the upper and lower surfaces of the member will be in bearing relation to the canted inner surfaces 22, 23, respectively of each lock. Also the tips of the member will be in bearing relation to the slanting inner surfaces, such as 11a, of the end walls 11 of the locks.

If when the beam is to be cambered, the brake heads have been keyed onto the truss locks in Fig. 1, the heads will now be slightly inclined outwardly from each other from their upper toes 38 as shown at $x$, $y$, in full lines, respectively, to the left of head 36a and to the right of head 36. This inclination of the heads is due to the fact that the upper and lower surfaces of each truss lock will have an angular position relative to the corresponding upper and lower surfaces of the compression member as clearly shown in Fig. 7 because of the bearing of the ends of said member against canted lock surfaces 22, 23 and 11a, inasmuch as thereby the two locks will be slightly tilted upwardly from their inner ends away from the beam. At this point, it will be noted that in contrast with the present general practice by which the heads are squared with the compression member, before cambering it, the heads will be slightly inclined and that in such inclined position compensation is made to counteract the undue toeing in of the lower toes of the heads when cambering said member.

When the assembly has been made to produce an uncambered beam as in Figs. 1 and 7 the compression member 1 is caused to be cambered as in Fig. 2 during the application of power and the further screwing in of the nuts onto the ends of the tension rod or member 2, and then the protruding terminals of the rod are upset and headed down as at 26, Fig. 3.

Due to the cambering action the heads will then be squared up with the beam, that is they will stand perpendicular with the compression member and so that the opposite side surfaces of the respective heads will be slightly inclined inwardly in front of the compression member, as in Fig. 2, and converge along vertical planes which meet well in advance of the beam.

The result is, that the lower toes of the heads are toed inwardly but will be disposed only in the same vertical planes as the upper toes, instead of into the objectional manner before described, and the shoe receiving faces of the heads will each also lie at an angle of one degree in twenty to the longitudinal axis of the completed truss beam, so that when the shoes 1ª, shown in broken lines are applied to the conventional faces of the heads their braking surfaces will be at angles corresponding with the bevel of the wheels 1ᵇ, also shown in broken lines.

Of course the brake heads may be applied to the ends of the beam or removed at any time, for the oversize openings of the collars, such as 42, of the heads can be readily slipped over and past the nuts and onto the truss locks, the boss 45 interlocked in the recess of each lock, and then the keys driven home whereby to hold the heads removably, rigidly and securely in their required positions. The inward position of each head on the beam is defined and limited by forcing it against the stop or centering means provided by the flange 24 of each truss lock, as in Fig. 7. Also, incidental to the described construction of the completed brake beam, the slight lateral canting 15 of each inclined nut seat 13, Fig. 12, tends to cause the nut to be more firmly seated when fully screwed home.

Several major mechanical defects of the standard A. A. R. types of brake beams with their concomitant parts are corrected by the described or equivalent truss-locked, rigid, interlocking brake beam with removable and replaceable brake heads. Namely, the tension rod is rigidly held and reinforced in the truss locks throughout its length by its deflected end portions 27 being snugly confined in each reinforcing thimble, such as 10, which extends from end to end of each lock, and because each of its rearward bends 29 bears solidly at the forward points of the bends against rounded bearing surfaces 30 of the locks. Thereby, practically all, if indeed not all, of the vibration, twisting and fatigue have been eliminated from the threaded portions of the tension rod within the tension nuts, and a stronger construction of beam has been achieved by confining the end portions of the compression and tension members within truss locks such as described. Most of the rod stresses will be concentrated at the rounded bearings, such as 30, and are completely removed from the smaller threaded portions of the tension rod.

A removable, rigid, interlocked brake head is provided which lends itself to the removal and replacement thereof by merely removing the locking key, and without disturbing any part of the beam proper. Also, the rectangular or equivalent type of truss lock has full bearing against the top, bottom and front sides of the brake head, as well as against the broad surface provided by the locking key, so that wear, if any, within the collar of the brake head should be held at a minimum.

Furthermore, such a truss locked brake beam has been so designed as to permit utilizing the present compression member, tension rod or member, strut and tension rod nuts of the standard brake beams now generally in service on the American railroads, so that such beams may be converted into brake beams of the present invention by the addition thereto of truss locks 3, 4, brake heads 36, 36ª and keys 47 or their equivalents, which can be applied from time to time when the beams are sent in for repairs. The brake beam with the truss locks permits the brake heads to be easily removed when worn or broken and to be replaced by new heads, without the necessity of removing the truss-locked beam from a car truck, and the construction is such as to hold each head rigidly to the beam at proper centers.

Modifications or substitutes are shown in Figs. 16 to 21 and the same will now be described, using the same reference numerals, where desirable, for any features which correspond to those previously described.

In Figs. 16 and 17 the brake head is shown as rigidly secured in position by a key 51 of much less transverse width than the key 47, and may be made of malleable steel, which is bendable. Here the head 36 has its collar 42 provided with upper and lower registering holes 52, 52, located at the ends of a vertical guide portion 53, the same being formed by means of an enlargement at the middle back portion of the back web 37 of the head, and which has a narrow passage therethrough for receiving the key 51. The key and the guide portion have correspondingly slanting surfaces at 54 and the leading end 51ª of the key is hammered or bent over to lock the head to the beam. Obviously, in this case the truss lock does not necessarily have the key deflecting anvil portion previously described, inasmuch as the reinforcing flange 24 may if desired be of the same shape at the back of the lock as at top and bottom; for the key 51 is located entirely to one side of the flange and does not strike the same.

Figs. 18 and 19 show a modification of the devices shown for making use of a rectangularly sectioned bar for the compression member; in that they disclose means for utilizing either such a bar or a bar 55 having a U-shaped section. When made for a U-shaped section the truss lock 56, provided with thimble 57, will have two parallel grooves 58, 58 in the inner surface of its front wall, one at each side of said thimble, which grooves form two shoulders 59, 59, which define the width of bar 55 or the extreme width of the U. Here the thimble 57 braces the legs of the U-section to hold it securely between the said shoulders, while the back of said section is braced between the back wall of the lock and a ledge 60, which obviously may extend around the inner end of the thimble as far as is possible, as shown in Fig. 19. The shoulder provided by ledge 60 may also form an abutment for the terminal of a conventional channel bar having a rectangular section, when such shoulder is rectangularly shaped to conform with the inner surface of such bar.

Now referring to Figs. 20 and 21, the truss lock 70 is substantially the same as previously described, having a reinforcing flange 71, including a back portion 72 and upper and lower portions 73, 74, respectively, but neither of the last two extend beyond the front of the truss lock, inasmuch as it is intended that said lock be used as both a right and as a left, so that it may be applied to either end of the beam. This makes the lock a universal one, instead of entirely separate locks to serve only as a right lock for one end of the beam and another lock to serve only as a left. Furthermore instead of having but one slanting edge, or absent corner beyond such edge, the lock has two slanting edges or the equivalent 75 and 76. These slanting edges extend in opposite directions and form the forward surfaces of the flange portions 73, 74, and the inclines extend along the opposite ends of a forwardly projecting, auxiliary, reinforcing flange 77 located at, and symmetrically with respect to, the front of the lock, so that the inclines tend to converge toward a central horizontal which bisects the lock. Therefore, when the position of the lock is reversed by turning it upside down at either end of the beam it will serve at either end, and provide for clearance of each hanger of the beam.

It is preferred that under the present invention each of the brake heads for a beam is caused to assume two different slants with respect to the ends of the beam, or, to be more exact, to the longitudinal axis of the strut to finish the beam for its ultimate purpose. The first slant of each head is that in which its lower toes are somewhat further apart than the upper toes when the parts are assembled and united as in Fig. 1, in which case the lateral surfaces of the two heads extend in planes inclined to the vertical, that is in planes spread apart downwardly and outwardly with relation to the struts longitudinal axis. The second slant of each head is that which is caused by the cambering of the compressing member to square up the heads with such member as shown in Fig. 2, so that the lateral surfaces of the two heads extend forwardly in vertical planes which are inclined inwardly and along converging lines with respect to the strut's longitudinal axis at the forward end of the strut. When the brake shoes are applied to the thus oriented heads, which preferably have their faces thus conformed to agree with the one in twenty bevel of the treads of the car wheels, their wear surfaces will also conform with the so beveled treads. Of course, if required at any time because of a different degree of bevel of car wheels, obvious, very slight, changes may be made in the upper and lower walls of the truss locks.

To state the matter somewhat differently, it is found that the braking faces of the shoes, applied to brake heads in which the lower toes are set too far inwardly toward each other, wear unevenly due more or less to such fact, which is caused by the act of cambering the compression member while its head-supporting members are held thereon with their upper and lower bearing surfaces parallel with the upper and lower surfaces of the compression member.

Consequently, after cambering, the braking faces of the shoes when positioned for braking are not concentric with the beveled treads of the wheels but rather are set more or less askew of the bevels of the treads, which is a condition in which uneven wear of the shoes will develop. This objection is overcome by the present invention for the reason that the wear surfaces of the shoes will be concentric, with the beveled wheel treads, and when the brakes are applied, will result in applying such wear surfaces evenly throughout to the bevels of the wheel treads, so that even wear will take place.

If it is desired at any time to have the canted inner surfaces of the designated walls of the truss locks omitted and to have such surfaces made parallel with the outer surfaces of such walls, that may be done, and still achieve some but not all of the desired benefits of the present invention.

Entirely new truss beams can be made throughout and supplied to the railroads under the present invention, and it will be obvious to those skilled in the same art that various other modifications and changes than those enumerated may be made in the improvements shown and described without departing from the spirit of the invention and the scope of the appended claims.

What I claim as new is:

1. A trussed brake beam with shoe-receiving heads, the same including compression and tension members, truss locks having sockets receiving the opposite ends of the same, a strut, nuts screwed on the tension member, brake heads fixed on the locks, and means on the locks compensating for and substantially overcoming subsequent inward movement or toeing-in of the lower toes of the heads during the cambering of the compression member, such compensating means including the upper and lower inner surfaces of the lock-sockets, and which surfaces lie at slight acute angles to the longitudinal axis of each lock.

2. A trussed brake beam with shoe-receiving heads, the same including a compression member, a threaded tension member, truss locks having sockets receiving the ends of the compression member, nuts screwed onto the tension member and bearing against the truss locks, a strut, means within the truss-locks compensating for and substantially overcoming, during cambering of the compression member, inward movement or toeing-in of the lower toes of the heads, such compensating means including the upper and lower inner surfaces of the lock-sockets, and which surfaces lie at slight acute angles to the longitudinal axis of each lock and brake heads fixed on the said locks in substantially true, forwardly converging, vertical planes, whereby when the brake shoes are applied to the heads their braking faces will have the required bevel for application to the wheels.

3. A trussed brake beam, including a compression member, a tension member having screw-threaded ends, truss locks having sockets receiving the ends of the compression member and provided with inclined internal thimbles through which extend the ends of the tension member, the locks having oppositely inclined bearing surfaces at the outer ends of the holes in the thimbles, nuts screwed onto the ends of the tension member and seated on said bearing surfaces, a strut, and each of the truss locks having internal upper and lower surfaces which lie at slight acute angles to the longitudinal axis of each lock and in full bearing relation to the upper and lower sides of the ends of the compression member and serving in association with the nuts, during the tightening thereof, to camber the compression member, to enforce the shifting of the locks from a position slightly inclined to the horizontal to a squared position at right angles to the horizontal, to the end that when the brake heads are secured to the locks the heads will converge in vertical planes with the faces converging according to the bevel of the wheels for a car truck.

4. A trussed brake beam according to claim 3, wherein the specified internal surfaces of the truss locks are parallel and slightly inclined to the horizontal.

5. A trussed brake beam, including a compression member, a tension member, hollow, non-circular, truss locks into which the ends of the members extend, such locks having oppositely inclined seating surfaces beyond the compression member and beyond which surfaces the ends of the tension member extend outwardly, adjustable means on said ends cooperating with said seating surfaces for securing the members in the locks, and brake heads having transverse openings surrounded by the material of the heads, and the heads slipped around and past the adjustable means and onto the locks, said openings being appreciably larger than the cross section of each lock, mutually interlocking means between the heads and the locks, and keying means taking up the play between the heads and locks and securing the heads on the locks.

6. A trussed brake beam according to claim 5, wherein the keying means of each lock is on the side of the lock opposite the interlocking means and resides in a bendable key substantially as broad as the contiguous side surface of the lock.

7. A trussed brake beam, including a compression member, a tension member, hollow truss locks adapted for mounting brake heads thereon and providing sockets receiving the ends of the compression member, inclined thimbles in and integral with the locks and receiving and reinforcing the ends of the tension member, the inner ends of the thimbles at the inner ends of the locks being rounded, and means cooperating with the locks for tensioning the tension member, and the tension member having rounded bends in bearing engagement with the locks, at the inner ends of the thimbles, the specified structure constituting a complete, rigid, brake beam unit independent of brake heads.

8. A lock for a trussed brake beam, the same comprising a hollow truss lock providing a socket for an end of a compression member and having an inclined thimble in its socket extending from an inclined seat on the outer end of the lock to the other end thereof, said thimble adapted to receive one end of a tension member to extend beyond said seat, the inner surfaces of the hollow lock adapted to bear on the top and bottom portions of the compression member and being slightly inclined to the upper and lower surfaces of the lock.

9. A lock for a trussed brake beam, the same comprising a hollow truss lock providing a socket for an end of a compression member and having an inclined thimble in its socket extending from an inclined seat on the outer end of the lock to the other end thereof, said thimble adapted to receive one end of a tension member to extend beyond said seat, the inner surfaces of the hollow lock adapted to bear on the top and bottom portions of the compression member and being slightly inclined to the upper and lower surfaces of the lock, and the inner transverse surface of the lock being slightly inclined and at a right angle to the said inclined surfaces within it.

10. A lock for a trussed brake beam, the same comprising a hollow truss lock providing a socket for an end of a compression member and having an inclined thimble in its socket extending from an inclined seat on the outer end of the lock to the other end thereof, said thimble adapted to receive one end of a tension member to extend beyond said seat, the inner surfaces of the hollow lock adapted to bear on the top and bottom portions of the compression member and being slightly inclined to the upper and lower surfaces of the lock, and the surface forming the said inclined seat being canted or slightly inclined laterally.

11. A lock for a trussed brake beam, the same comprising a hollow truss lock providing a socket for an end of a compression member and having an inclined thimble in its socket extending from an inclined seat on the outer end of the lock to the other end thereof, said thimble adapted to receive one end of a tension member to extend beyond said seat, the inner surfaces of the hollow lock adapted to bear on the top and bottom portions of the compression member and being slightly inclined to the upper and lower surfaces of the lock, and the inner end of the surrounding wall of the aperture through the thimble having a rounding to form a bearing for the tension rod.

12. A lock for a trussed brake beam, the same comprising a hollow truss lock providing a socket for an end of a compression member and having an inclined thimble in its socket adapted to receive one end of a tension member, the lock having an inclined nut seat at one end of the thimble, and an outer reinforcing flange on and substantially surrounding the lock, located at the inner end of the lock, said flange constituting a lateral abutment for a brake head adapted to be mounted on the lock.

13. A lock for a trussed brake beam, the same comprising a hollow truss lock providing a socket for an end of a compression member and having an inclined thimble in its socket adapted to receive one end of a tension member, the lock having an inclined nut seat at one end of the thimble, and an outer reinforcing flange on the lock, located at the inner end of the lock, said flange extending around the lock entirely except at one corner thereof, where the flange is cut away or absent to provide clearance for the brake beam hanger.

14. A lock for a trussed brake beam, the same comprising a hollow truss lock providing a socket for an end of a compression member and having an inclined thimble in its socket adapted to receive one end of a tension member, the lock having an inclined nut seat at one end of the thimble, and the lock having means at one of its outer surfaces forming centering means to interlock with a portion of a brake head, and the lock having means at the surface opposite to aforesaid surface adapted to upset a key to fix the head in position.

15. A lock for a trussed brake beam, the same comprising a hollow truss lock providing a socket for an end of a compression member and having an inclined thimble in its socket adapted to receive one end of a tension member, the lock having an inclined nut seat at one end of the thimble, and an outer reinforcing flange on the lock, located at the inner end of the lock, said flange having an outward anvil portion adapted to upset the end of a key for a brake head.

16. A hollow brake head-receiving member, the hollow interior providing a socket for receiving the end of a brake beam compression member, and a thimble within and integral with the member for receiving the end of a tension member, said thimble being slightly inclined upwardly in relation to the longitudinal axis of the receiving member, and the inner end of the thimble having a rounded bearing surface for engagement by the tension member of such beam.

17. A car brake head, including the head proper having a shoe-receiving face, a longitudinal back rib reinforcing the head, and a back collar integral with the rib, the rib and collar mutually reinforcing each other, and the collar having its opening extending transversely of the face and adapted to receive the end of a brake beam, the wall around the opening fully surrounding the opening and having a surface interruption relative thereto breaking such surface to provide interlocking means to cooperate with complementary means on the beam end to center the head, said collar adapted to be fixed to said end to hold the head thereon.

18. A car brake head according to claim 17, wherein such surface interruption comprises a boss projecting inwardly from the front portion of the inner surface of the collar in a direction away from the shoe-receiving face.

19. A car brake head according to claim 17, wherein the rear inner surface of the collar is on a slight slant to form a bearing surface for a key.

20. A trussed brake beam, including compression and tension members, truss locks, and means for rigidly securing the locks to the ends of said members, brake heads having back collars receiving and surrounding the locks, interlocking means between the locks and heads and centering the heads in position, and means for securing the heads in centered position.

21. A trussed brake beam according to claim 20 wherein the head securing means comprises a key driven between the contiguous surfaces of each lock and the collar of the head thereon.

22. A trussed brake beam according to claim 20, wherein each truss lock is provided with an outwardly projecting shoulder and the leading end of the key is upset against said shoulder.

23. A trussed brake beam according to claim 20, wherein each truss lock is provided with a reinforcing flange bordering its inner end against which abuts the adjacent side surface of the head.

24. A trussed brake beam according to claim 20, wherein each head-collar and each truss lock is rectangular, and the securing means is a flat bendable key having an area substantially as large as the area of the back wall of the collar.

25. A trussed brake beam, including compression and tension members, truss locks receiving the ends of the compression member and having nut seats inclined toward each other from front to back of the beam and slightly canted laterally, the ends of the tension member extending through and beyond the seats, nuts threaded onto the rod ends, and means within the truss locks and cooperating with the nuts when the nuts are rotated and forced against such seats to tension the rod and to camber the compression member, thereby squaring up the locks to receive brake heads in their proper braking position.

26. A trussed brake beam according to claim 25, including the combination therewith of brake heads having faces for receiving shoes, and provided with back collars surrounding the locks, the openings of which extend transversely of said shoe faces, said openings having enlarged dimensions of a size such as to permit the collars to clear the nuts when the heads are being positioned on the truss locks for removed therefrom, and means for securing the heads to the locks.

27. A trussed brake beam, including compression and tension members, the compression member being U-shaped in cross section, hollow truss locks providing sockets receiving the ends of the compression member, inclined thimbles in and integral with the locks, and received in the channel of the compression member and bracing the ends thereof, said locks having inclined nut seats at their outer ends and the thimbles extending from said seats to the inner ends of the locks, and the ends of the tension rod extending through the thimbles and seats and beyond the seats, nuts threaded onto said ends and bearing on said seats, the locks having recesses at opposite sides of the thimbles and in which are seated the edge portions of the U shaped compression member, and the locks having shoulders at the outer sides of the recesses, against which bear the outer sides of the edges of the compression member.

28. A lock for a trussed brake beam, the same comprising a hollow truss lock providing a socket for an end of a compression member and having an inclined thimble in its socket adapted to receive one end of a tension member, the lock having an inclined nut seat at one end of the thimble, and an outer reinforcing flange on the lock, located at the inner end of the lock, and extending around the upper, lower and back surfaces of the lock, together with a corresponding reinforcing flange on the front of the lock and which is cut away or absent adjacent to both the upper and lower surfaces of the lock to provide clearance for the brake beam hanger if the lock is reversed so that the bottom surface becomes the top surface.

29. A lock for a trussed brake beam, the same comprising a hollow truss lock providing a socket for an end of a compression member and having an inclined thimble in its socket adapted to receive one end of a tension member, the lock having an inclined nut seat at one end of the thimble and an outer reinforcing flange on the lock located at the inner end of the lock, and extending around the upper, lower and back surfaces of the lock, together with a corresponding reinforcing flange on the front of the lock and having its front edge inclined inwardly in opposite directions, with the inclined surfaces extending along the front ends of those portions of the first mentioned flange which extend along the upper and lower surfaces of the lock, whereby to provide clearance for the brake beam hanger if the lock is reversed so that the bottom surface becomes the top surface.

30. A lock for a trussed brake beam, the same comprising a hollow truss lock providing a socket for an end of a compression member and having an inclined thimble in its socket adapted to receive one end of a tension member, the lock having an inclined nut seat at one end of the thimble, and an outer reinforcing flange on the lock, located at the front of the inner end of the lock, and which is cut away or absent at its upper and lower ends to provide clearance for a brake beam hanger at either end of a beam.

31. A trussed brake beam unit for mounting brake heads thereon, including compression and tension members, truss locks having sockets receiving the end portions of the compression member, thimbles within the sockets and receiving the ends of the tension member, a strut between the said members, nuts seated on the outer ends of the locks and screwed onto the ends of the tension member, and the compression member being cambered, the inner longitudinal surfaces of the truss locks seating the side surfaces of the end portions of the compression member in rigid bearing contact with such inner surfaces in such relation that the longitudinal axis of each lock definitely extends at a slight acute angle to the longitudinal axis of the end portion fixed within the lock, and constituting means compensating for and substantially overcoming, during the cambering of the compression member, the inward toeing of the lower toes of the brake heads which are ultimately fixed on the truss locks.

32. A trussed brake beam unit for mounting brake heads thereon according to claim 31, wherein the longitudinal axis of each thimble extends in a plane which also definitely extends at a slight angle that corresponds with the angle at which the longitudinal axis of the lock extends with respect to the end portion of the compression member within the lock.

CHARLES R. BUSCH.